US012212085B2

(12) United States Patent
Makino et al.

(10) Patent No.: US 12,212,085 B2
(45) Date of Patent: Jan. 28, 2025

(54) CONNECTOR DEVICE HAVING CASE AND BOARD CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Kenji Makino, Mie (JP); Toshikazu Sakurai, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 372 days.

(21) Appl. No.: 17/617,549

(22) PCT Filed: Jun. 2, 2020

(86) PCT No.: PCT/JP2020/021679
§ 371 (c)(1),
(2) Date: Dec. 8, 2021

(87) PCT Pub. No.: WO2020/255695
PCT Pub. Date: Dec. 24, 2020

(65) Prior Publication Data

US 2022/0247106 A1 Aug. 4, 2022

(30) Foreign Application Priority Data

Jun. 21, 2019 (JP) ................................ 2019-115274

(51) Int. Cl.

| | |
|---|---|
| ***H01R 12/72*** | (2011.01) |
| ***H01R 12/51*** | (2011.01) |
| ***H01R 13/52*** | (2006.01) |

(52) U.S. Cl.
CPC ......... *H01R 12/724* (2013.01); *H01R 12/515* (2013.01); *H01R 13/5202* (2013.01)

(58) Field of Classification Search
CPC ......................... H01R 13/5202; H01R 13/502; H01R 13/514; H01R 12/515; H01R 12/724

(Continued)

(56) References Cited

U.S. PATENT DOCUMENTS 6,407,925 B1 * 6/2002 Kobayashi ........... H05K 5/0052 361/752
6,962,499 B2 * 11/2005 Yamamoto ......... H01R 13/4361 439/752

(Continued)

FOREIGN PATENT DOCUMENTS

JP H03-015483 U 2/1991
JP 2007-335297 A 12/2007

OTHER PUBLICATIONS

International Search Report issued on Aug. 25, 2020 for WO 2020/255695 A1 (4 pages).

*Primary Examiner* — Marcus E Harcum
(74) *Attorney, Agent, or Firm* — Venjuris, P.C.

(57) ABSTRACT

It is aimed to prevent the damage of terminal fittings. A connector device (A) is provided with a case formed with an opening portion in a front surface and having an open lower surface, and a board connector including L-shaped terminal fittings and a housing to be mounted into the opening portion. The terminal fitting includes a penetrating portion extending in a front-rear direction and a board connecting portion extending downward from a rear end of the penetrating portion and to be accommodated into the case. The (Continued)

housing includes a terminal holding member for holding the penetrating portions penetrating therethrough, the terminal holding member being mounted into the opening portion from behind, and a protecting member separate from the terminal holding member, the protecting member surrounding front end parts of the penetrating portions by being mounted into the opening portion from front.

3 Claims, 7 Drawing Sheets

(58) Field of Classification Search
USPC .......................................... 439/76.1, 76.2
See application file for complete search history.

(56) References Cited

U.S. PATENT DOCUMENTS 7,118,646 B2 * 10/2006 Hunkeler ............... H05K 7/142 361/679.01
7,331,801 B1 * 2/2008 Eichorn ............... H01R 12/724 439/926
7,419,385 B2 * 9/2008 Itou ........................ H01R 12/00 439/76.1
8,269,116 B2 * 9/2012 Ambo .................. H05K 5/0069 174/541
8,357,015 B2 * 1/2013 Kohmura .............. B29C 45/006 361/752
8,545,238 B2 * 10/2013 Takeda ............... H01R 13/6658 439/377
8,657,609 B2 * 2/2014 Yanagisawa ......... H05K 5/0056 439/79
8,738,097 B2 * 5/2014 Hong ................. H01R 13/5202 455/575.4
8,770,989 B2 * 7/2014 Ohhashi ............... H05K 5/0069 439/589
9,293,870 B1 * 3/2016 Koczwara ............ H05K 5/0069
10,062,986 B2 * 8/2018 Shibaya ............. H01R 13/6315
11,271,340 B2 * 3/2022 Yamamoto ............. H05K 3/306
2005/0020104 A1 * 1/2005 Yamamoto ......... H01R 13/4361 439/76.1
2005/0090132 A1 * 4/2005 Miyazaki ......... H01R 13/62905 439/130
2005/0287840 A1 * 12/2005 Takase ............... H01R 12/7023 439/76.1
2007/0218715 A1 9/2007 Itou et al.
2015/0056845 A1 2/2015 Tanaka et al.

* cited by examiner

CONNECTOR DEVICE HAVING CASE AND BOARD CONNECTOR

CROSS REFERENCE TO RELATED APPLICATIONS

This application is a national phase of PCT application No. PCT/JP2020/021679, filed on 2 Jun. 2020, which claims priority from Japanese patent application No. 2019-115274, filed on 21 Jun. 2019, all of which are incorporated herein by reference.

TECHNICAL FIELD

The present disclosure relates to a connector device.

BACKGROUND

Patent Document 1 discloses a connector device including a case having a rectangular opening portion in a front surface and a board connector to be mounted into the opening portion. The board connector includes a housing and L-shaped terminal fittings mounted while penetrating through the housing in a front-rear direction. The terminal fitting includes a board connecting portion extending downward in the case. A lower end part of the board connecting portion is located below the opening portion and connected to a circuit board. The case is composed of a case upper lid having an open lower surface and a case lower lid for closing an open part in the lower surface of the case upper lid. Out of the rectangular opening portion, an upper edge part and both left and right side edge parts are formed on the case upper lid, and a lower edge part of the opening portion is formed on the case lower lid.

In assembling the board connector with the case, the case upper lid and the case lower lid are separated and the opening portion is left open downward and, then, the board connector is fit into the opening portion from below the case upper lid. Thereafter, the case lower lid is united with the case upper lid, whereby the board connector is held in a state fit in the opening portion. According to this structure, even if lower end parts of the board connecting portions are located below the opening portion, the board connector can be assembled with the case.

PRIOR ART DOCUMENT

Patent Document

Patent Document 1: JP 2007-335297 A

SUMMARY OF THE INVENTION

Problems to be Solved

If the case is made of metal in the connector device of Patent Document 1 described above, weight can be reduced if the open part in the lower surface of the case upper lid is closed by the circuit board without using the case lower lid. However, if the case lower lid is not provided, an opening edge part of the opening portion needs to be continuous over the entire periphery. In this case, if an attempt is made to mount the board connector into the opening portion from front of the case, the lower end parts of the board connecting portions may interfere with the opening edge part of the opening portion to be damaged.

Note that it is considered as a means for avoiding the interference of the board connecting portions and the opening edge part to insert the board connector into the case through the open part in the lower surface of the case and fit the board connector into the opening portion. However, if an attempt is made to cause a receptacle of the board connector to project forward of the case, a space for temporarily accommodating the board connector has to be secured in the case. Thus, a new problem of enlarging the case arises. Further, the board connector needs to be fixed to the opening portion from the inside of the case by bolting. It is very difficult to perform a fastening operation using a tool such as a driver in the case. Therefore, it is difficult to adopt a method for assembling the board connector through the open part in the lower surface of the case.

A connector device of the present disclosure was completed on the basis of the above situation and aims to prevent the damage of terminal fittings.

Means to Solve the Problem

The present disclosure is directed to a connector device with a case formed with an opening portion in a front surface and having an open lower surface, and a board connector including an L-shaped terminal fitting and a housing to be mounted into the opening portion, wherein the terminal fitting includes a penetrating portion extending in a front-rear direction and a board connecting portion extending downward from a rear end of the penetrating portion and to be accommodated into the case, and the housing includes a terminal holding member for holding the penetrating portion penetrating therethrough, the terminal holding member being mounted into the opening portion from behind, and a protecting member separate from the terminal holding member, the protecting member surrounding a front end part of the penetrating portion by being mounted into the opening portion from front.

Effect of the Invention

The damage of terminal fittings can be prevented.

DETAILED DESCRIPTION TO EXECUTE THE INVENTION

Description of Embodiments of Present Disclosure

Figure 1:
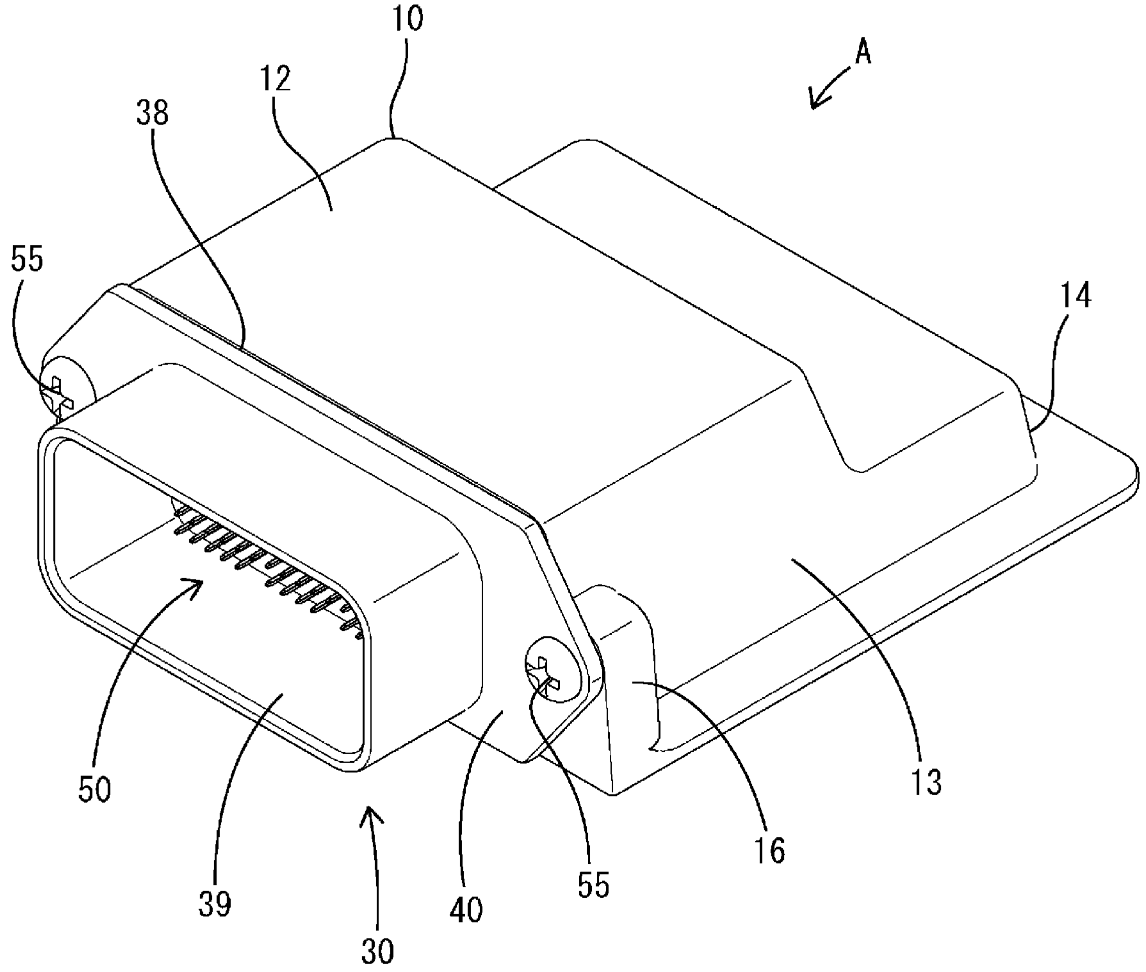
FIG. 1 is a perspective view of a connector device of one embodiment.

First, embodiments of the present disclosure are listed and described.

(1) The connector of the present disclosure is provided with a case formed with an opening portion in a front surface and having an open lower surface, and a board connector including an L-shaped terminal fitting and a housing to be mounted into the opening portion, wherein the terminal fitting includes a penetrating portion extending in a front-rear direction and a board connecting portion extending downward from a rear end of the penetrating portion and to be accommodated into the case, and the housing includes a terminal holding member for holding the penetrating portion penetrating therethrough, the terminal holding member being mounted into the opening portion from behind, and a protecting member separate from the terminal holding member, the protecting member surrounding a front end part of the penetrating portion by being mounted into the opening portion from front.

According to the configuration of the present disclosure, in assembling the board connector with the case, the protecting member separated from the terminal holding member is mounted into the opening portion from front of the case. The terminal holding member is mounted into the opening portion through an opening in the lower surface of the case. In an assembling process of the board connector, the board connecting portion located behind the terminal holding member needs not be passed through the opening portion. Thus, the connector device of the present disclosure can prevent the damage of the terminal fitting.

(2) Preferably, the case is formed with a receiving portion projecting into the case from a part of an inner peripheral surface of the opening portion, and a retaining portion to be overlapped on a front side of the receiving portion when the terminal holding member is mounted into the opening portion is formed on an outer peripheral surface of the terminal holding member. According to this configuration, with the terminal holding member mounted in the opening portion, the retaining portion of the terminal holding member is in contact with the front side of the receiving portion of the opening portion. Thus, the rearward separation of the terminal holding member from the opening portion can be prevented.

(3) In (2), the protecting member is preferably formed with a pressing portion for sandwiching the retaining portion in the front-rear direction between the receiving portion and the pressing portion. According to this configuration, if the protecting member is mounted in the case, the retaining portion is sandwiched between the pressing portion and the receiving portion. In this way, the terminal holding member can be fixed to the case.

(4) Preferably, a sealing member is mounted between an outer peripheral surface of the protecting member and an inner peripheral surface of the opening portion. According to this configuration, the opening portion can be sealed in a liquid-tight manner. Since the sealing member needs not be provided on the outer periphery of the terminal holding member, the terminal holding member can be displaced in a vertical or lateral direction in the opening portion. Therefore, mounting easiness into the opening portion can be prioritized in designing the shape of the terminal holding member.

Details of Embodiment of Present Disclosure

Figure 2:
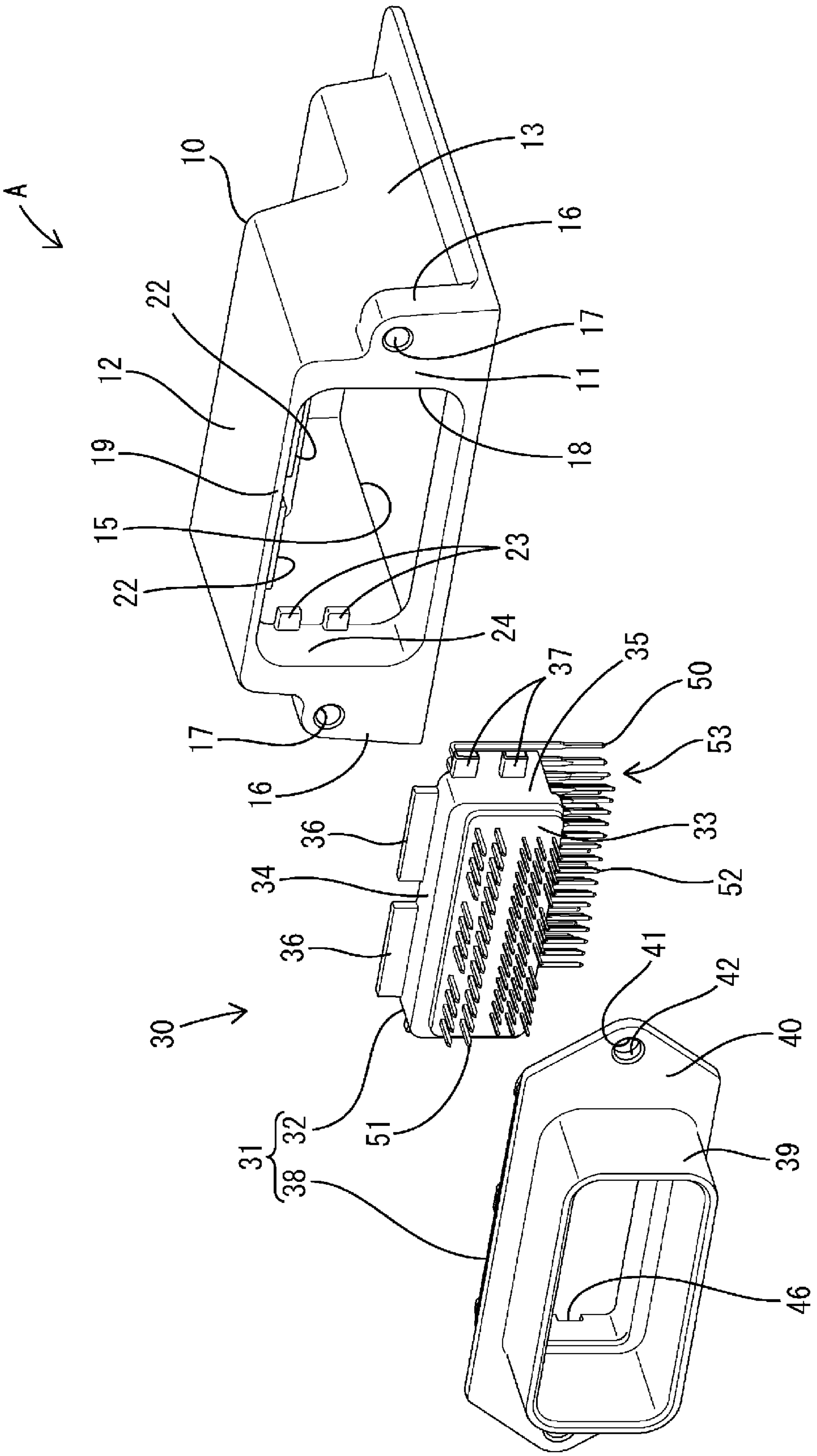
FIG. 2 is an exploded perspective view of the connector device.
Figure 3:
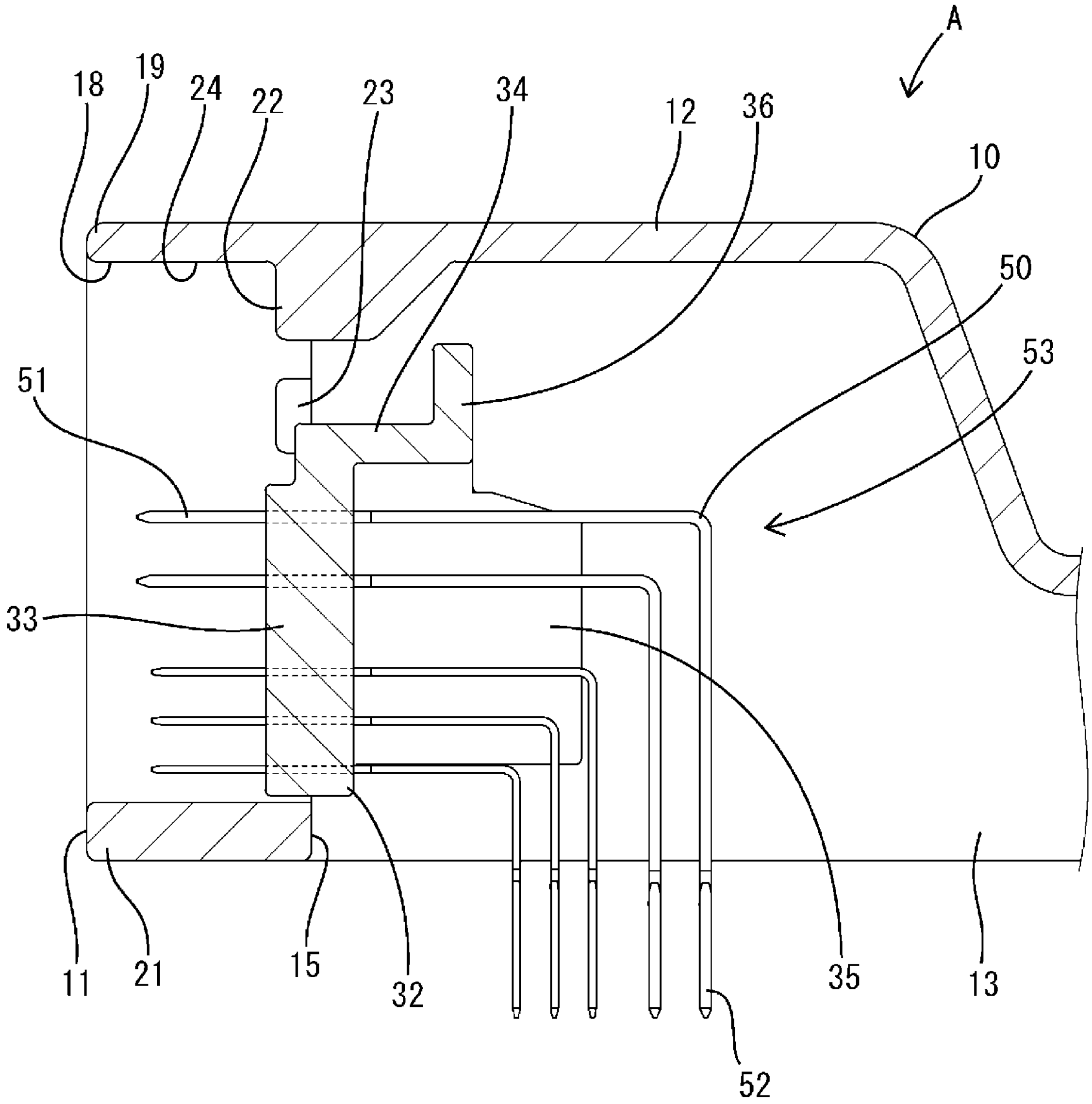
FIG. 3 is a side view in section showing an assembling process of a terminal holding member with a case.
Figure 4:
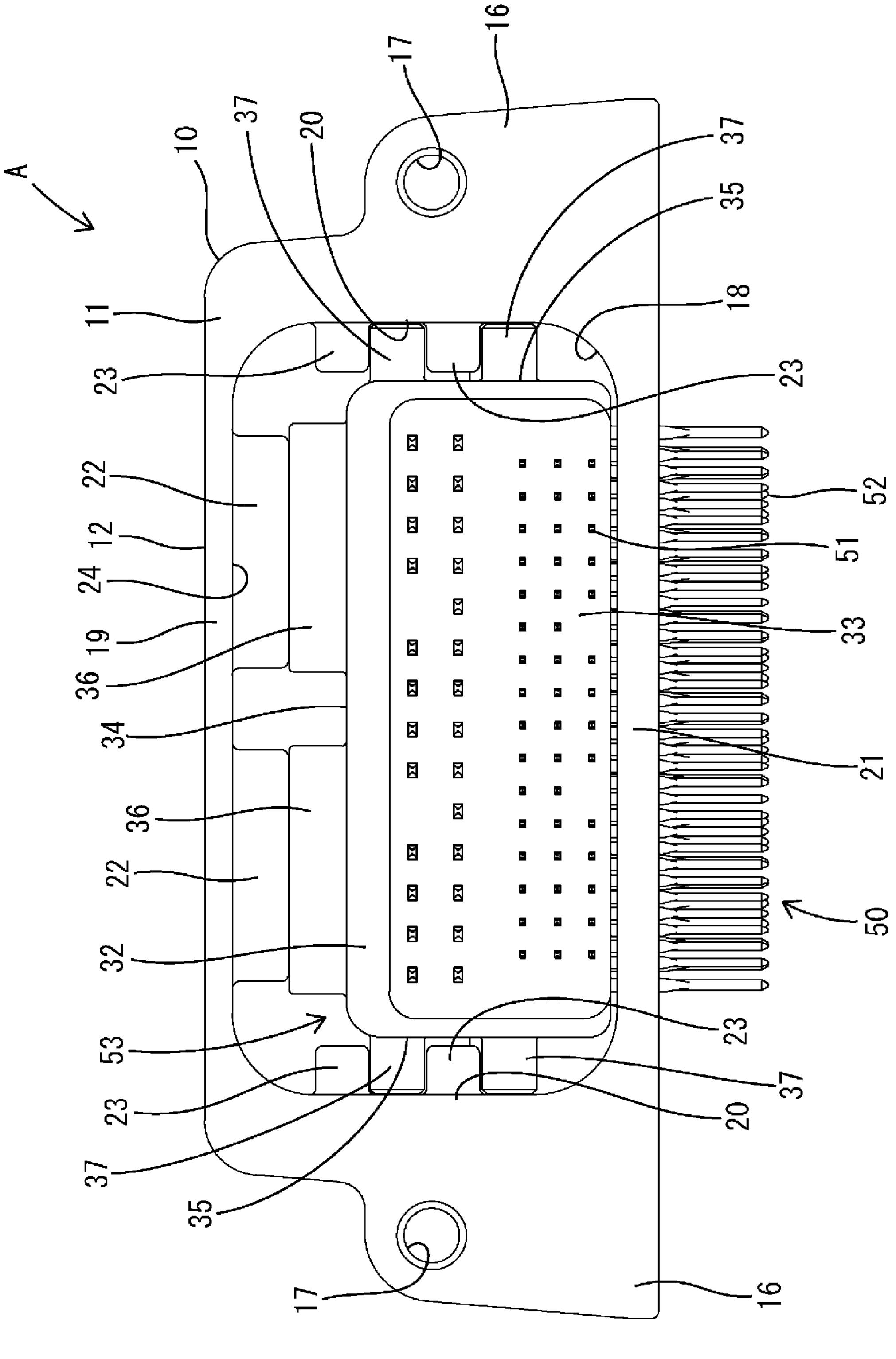
FIG. 4 is a front view showing the assembling process of the terminal holding member with the case.
Figure 5:
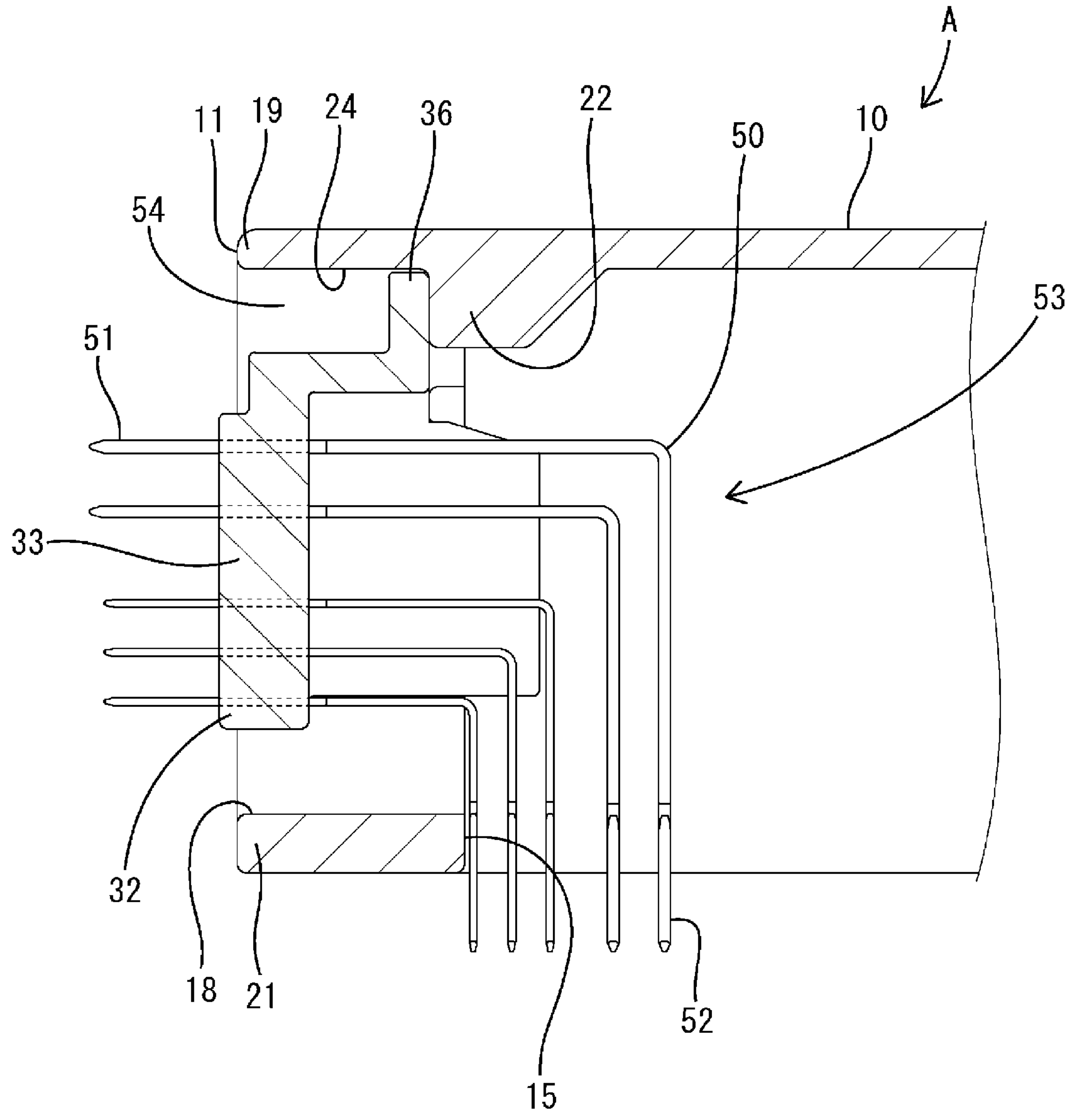
FIG. 5 is a side view in section showing a state where the terminal holding member is assembled at a proper position with the case.
Figure 6:
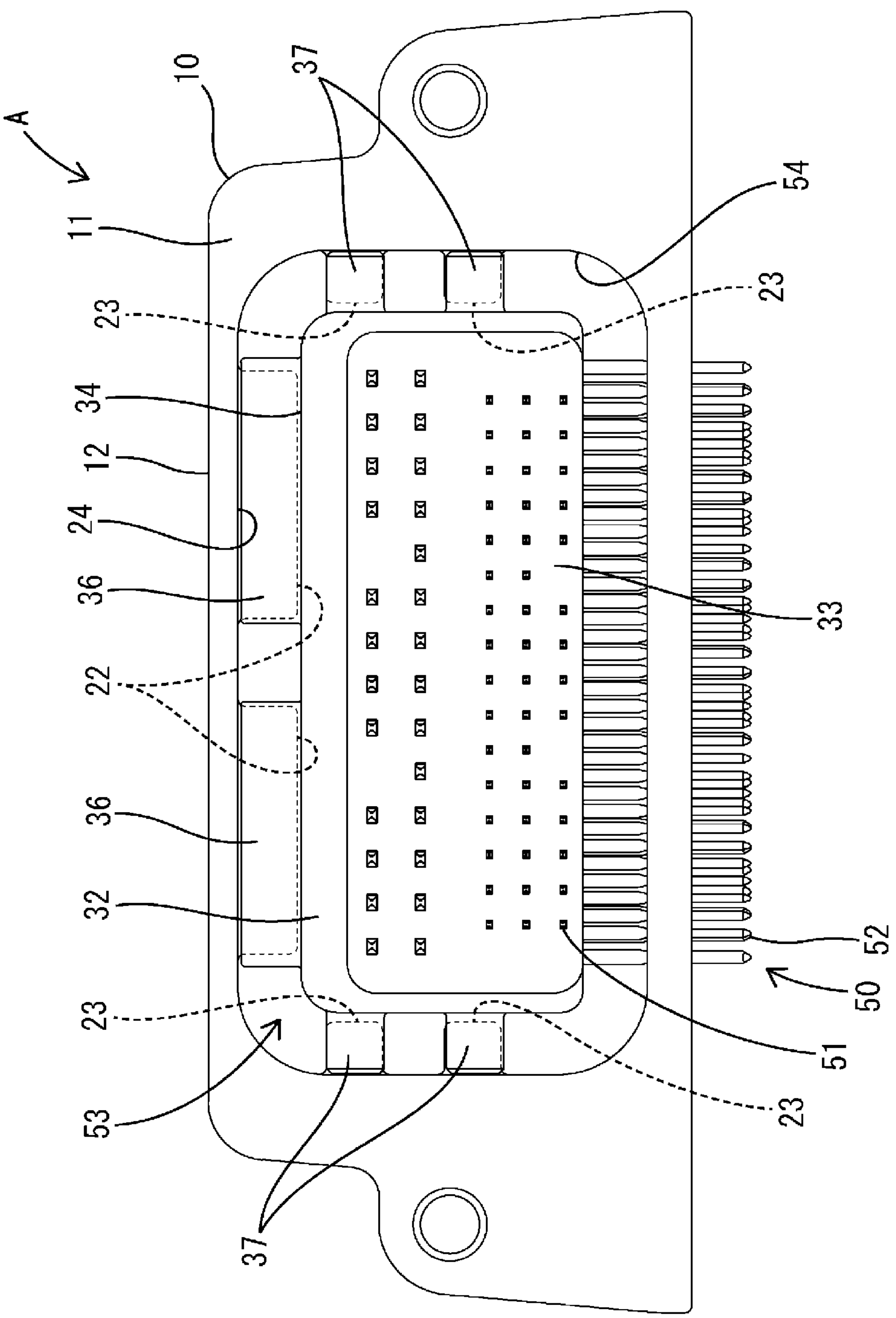
FIG. 6 is a front view showing the state where the terminal holding member is assembled at the proper position with the case.
Figure 7:
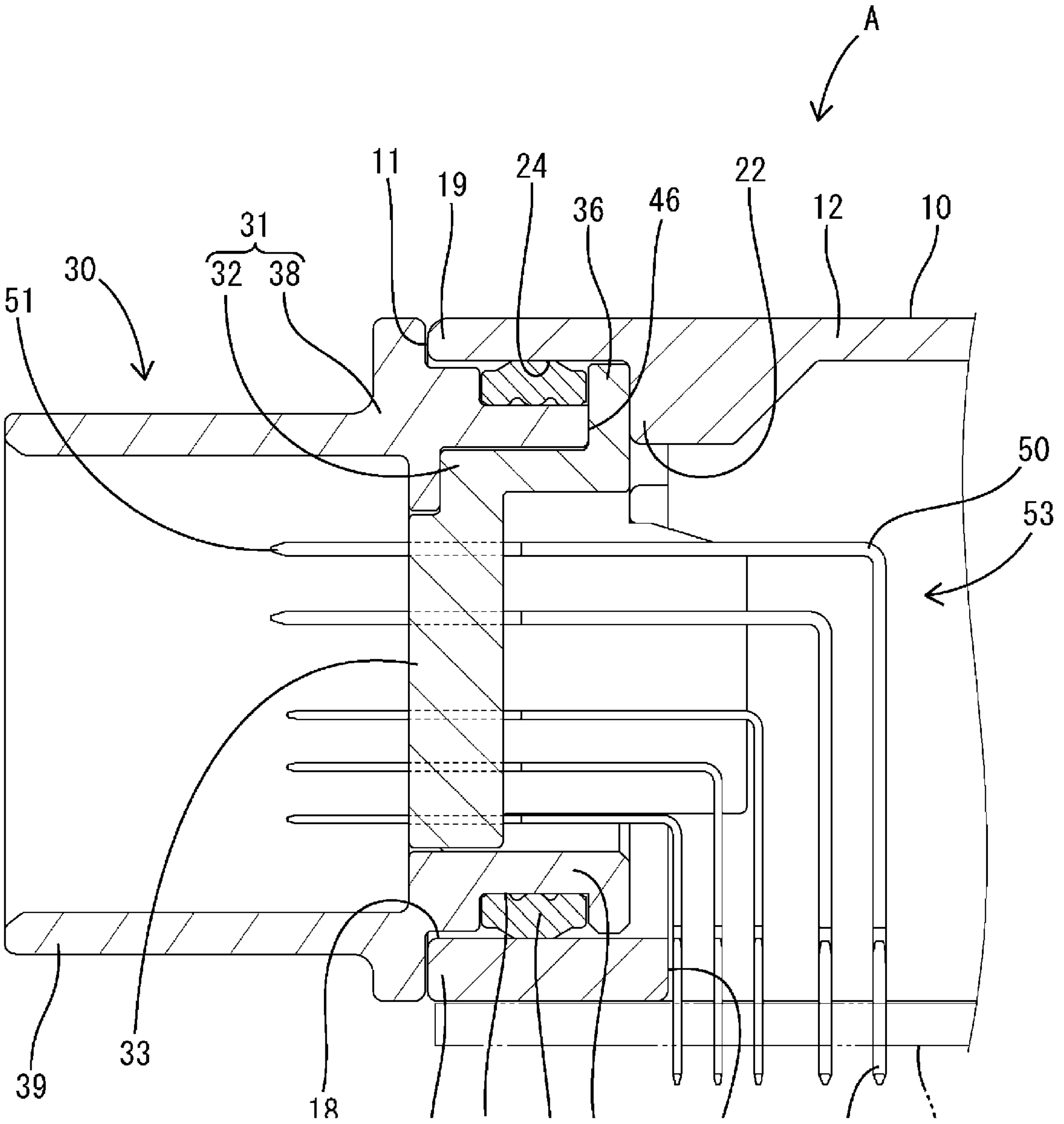
FIG. 7 is a side view in section showing a state where a board connector is assembled with the case.

A specific embodiment of a connector device A of the present disclosure is described with reference to FIGS. 1 to 7. The connector device A of this embodiment is configured by assembling a case 10 made of metal and a board connector 30 composed of a plurality of components. As shown in FIG. 7, the connector device A is mounted on a circuit board P. In this embodiment, a left side in FIGS. 3, 5 and 7 is defined as a front side concerning a front-rear direction. Upper and lower sides shown in FIGS. 1 to 7 are directly defined as upper and lower sides concerning a vertical direction. Left and right sides shown in FIGS. 4 and 6 are directly defined as left and right sides concerning a lateral direction.

The case 10 is in the form of a box having a front wall portion 11, an upper wall portion 12, both left and right side wall portions 13 and a rear wall portion 14 and having an entirely open lower surface. An open part 15 in the lower surface of the case 10 is closed by the circuit board P. Both left and right end parts of the front wall portion 11 function as a pair of mounting portions 16. A female screw hole 17 having an axis oriented in the front-rear direction is formed in the front surface of the mounting portion 16.

The case 10 is formed with an opening portion 18 for allowing communication between an internal space of the case 10 and an external space in front of the case 10. The opening portion 18 is a rectangular opening in a wide region of the front wall portion 11 between the both left and right mounting portions 16. In other words, the opening portion 18 penetrates through the front wall portion 11 in the front-rear direction. The opening portion 18 has an upper edge part 19, both left and right side edge parts 20 extending downward from both left and right ends of the upper edge part 19 and a lower edge part 21 coupling the lower ends of the both left and right side edge parts 20. An opening edge part of the opening portion 18 is continuous over the entire periphery.

A plurality of receiving portions 22, 23 are formed on the inner peripheral surface of the opening portion 18. A pair of left and right upper edge side receiving portions 22 projecting downward are formed on the lower surface (inner surface) of the upper edge part 19. A pair of side edge side receiving portions 23 vertically spaced apart are formed on each of the side surfaces (inner surfaces) of the both left and right side edge parts 20. These receiving portions 22, 23 are disposed in a rear end part of the inner peripheral surface of the opening portion 18. A region forward of the receiving portions 22, 23 on the inner peripheral surface of the opening portion 18 functions as a sealing surface 24.

The board connector 30 is configured by assembling a housing 31 made of synthetic resin and a plurality of terminal fittings 50 made of metal. The housing 31 includes a terminal holding member 32 and a protecting member 38, which is a component separate from the terminal holding member 32. The terminal holding member 32 includes a body portion 33 in the form of a flat plate having a plate thickness direction oriented in the front-rear direction, an upper surface portion 34 and both left and right side surface portions 35. The upper surface portion 34 extends horizontally (at a right angle to the body portion 33) rearward from the upper edge of the body portion 33. The both left and right side surface portions 35 extend rearward at a right from both left and right side edges of the body portion 33 and are connected at a right angle to both left and right side edges of the upper surface portion 34. That is, the terminal holding member 32 is in the form of a box having open rear and lower surfaces.

A pair of left and right upper surface side retaining portions 36 in the form of walls projecting upward at a right angle are formed on a rear end part of the outer surface (upper surface) of the upper surface portion 34. A pair of side surface side retaining portions 37 in the form of walls projecting laterally outward at a right angle are formed on a rear end part of each of the outer surfaces (outer side surfaces) of the both left and right side surface portions 35. The pair of upper and lower side surface side retaining portions 37 are vertically spaced apart. A vertical dimension of the side surface side retaining portions 37 is slightly smaller than an interval between the pair of upper and lower side edge side receiving portions 23.

A lateral minimum dimension (distance between the outer surface of the left side surface portion 35 and the outer surface of the right side surface portion 35) of the terminal holding member 32 is set slightly smaller than an interval between the left and right side edge side receiving portions 23. A lateral dimension (maximum width of the terminal holding member 32) from the projecting ends of the left side surface side retaining portions 37 to those of the right side surface side retaining portions 37 is set larger than an interval between the left and right side edge side receiving portions 23 and slightly smaller than a width of the opening portion 18. A vertical dimension (height of the terminal holding member 32) from the lower end of the body portion 33 of the terminal holding member 32 to the upper ends of the upper surface side retaining portions 36 is set slightly smaller than a vertical dimension from the upper surface of the lower edge part 21 of the opening portion 18 to the lower ends of the upper edge side receiving portions 22.

By setting the dimensions in this way, the terminal holding member 32 can be accommodated into the opening portion 18 from behind the opening portion 18 (from inside of the case 10). At this time, in the process of accommodating the terminal holding member 32 into the opening portion 18, the upper surface side retaining portions 36 can be displaced further forward than the upper edge side receiving portions 22 without interfering with the upper edge side receiving portions 22. Further, the side surface side retaining portions 37 can also be displaced further forward than the side edge side receiving portions 23 without interfering with the side edge side receiving portions 23.

Further, with the retaining portions 36, 37 located forward of the receiving portions 22, 23, the terminal holding member 32 can be displaced upward in the opening portion 18 as shown in FIG. 6. If the terminal holding member 32 is displaced upward in the opening portion 18, the upper surface side retaining portions 36 are located to face the upper edge side receiving portions 22 in the front-rear direction at the same height. If the terminal holding member 32 is displaced upward in the opening portion 18, the side surface side retaining portions 37 are located to face the side edge side receiving portions 23 in the front-rear direction at the same heights.

The protecting member 38 includes a receptacle 39 in the form of a rectangular tube penetrating in the front-rear direction and a flange portion 40 protruding from the outer periphery of the receptacle 39. As shown in FIG. 2, a pair of left and right through holes 41 penetrating in the front-rear direction are formed in both left and right end parts of the flange portion 40. Spacers 42 made of metal are displaced on the inner peripheries of the through holes 41. The both left and right through holes 41 are disposed at positions facing the female screw holes 17 of the case 10.

As shown in FIG. 7, a region of the receptacle 39 behind the flange portion 40 functions as a tubular fitting portion 43. The tubular fitting portion 43 is fit into the opening portion 18. A sealing groove 44 is formed in the outer periphery of the tubular fitting portion and a ring-shaped sealing member 45 is mounted into the sealing groove 44. With the tubular fitting portion 43 fit in the opening portion 18, the sealing member 45 seals between the outer peripheral surface of the tubular fitting portion 43 and the inner peripheral surface of the opening portion 18 in a liquid-tight manner. A region of the terminal holding member 32 forward of the retaining portions 36, 37 is fit into the tubular fitting portion 43. A part of a rear end part of the tubular fitting portion 43 facing the upper surface side retaining portions 36 and the side surface side retaining portions 37 functions as a pressing portion 46.

The terminal fitting 50 is formed by bending a metal material into an L shape in a side view orthogonal to the front-rear direction. The terminal fitting 50 includes a penetrating portion 51 extending in the front-rear direction and a board connecting portion 52 extending downward at a right angle from the rear end of the penetrating portion 51. The terminal fitting 50 is held in the terminal holding member 32 with the penetrating portion 51 penetrating through the body portion 33. By integrating the plurality of terminal fittings 50 with the terminal holding member 32, a terminal module 53 is configured.

With the plurality of terminal fittings 50 held in the terminal holding member 32, the penetrating portions 51 are arranged in parallel to each other and the board connecting portions 52 are arranged in parallel to each other. Front end parts of the penetrating portions 51 project forward of the body portion 33 (terminal holding member 32). Rear end parts of the penetrating portions 51 and the entire board connecting portions 52 are exposed behind the body portion 33. Lower end parts of the board connecting portions 52 are located below the lower end of the terminal holding member 32 (body portion 33).

Next, an assembling procedure of the connector device A is described. First, the terminal module 53 is assembled with the case 10 with the terminal holding member 32 and the protecting member 38 separated. At this time, the terminal module 53 is accommodated into the case 10 through the open part 15 in the lower surface of the case 10 and the terminal holding member 32 is accommodated into the opening portion 18 from behind. A moving direction of the terminal holding member 32 in accommodating the terminal holding member 32 into the opening portion 18 is a direction parallel to a penetrating direction (front-rear direction) of the opening portion 18. As shown in FIG. 4, the height of the terminal holding member 32 is so adjusted that the upper surface side retaining portions 36 are at positions lower than the upper edge side receiving portions 22. Simultaneously, the height of the terminal holding member 32 is so adjusted that the side surface side retaining portions 37 do not interfere with the side edge side receiving portions 23. Then, as shown in FIG. 5, the terminal holding member 32 is inserted into the opening portion 18 until the upper surface side retaining portions 36 are located in front of the upper edge side receiving portions 22. Simultaneously, the terminal holding member 32 is inserted into the opening portion 18 until the side surface side retaining portions 37 are located in front of the side edge side receiving portions 23.

Thereafter, the terminal module 53 is displaced upward, the upper surface side retaining portions 36 are brought into surface contact with the front surfaces of the upper edge side receiving portions 22 and the side surface side retaining portions 37 are brought into surface contact with the front surfaces of the side edge side receiving portions 23. A displacing direction of the terminal module 53 (terminal holding member 32) at this time is a direction perpendicular to the penetrating direction (vertical direction) of the opening portion 18 and parallel to a length direction of the board connecting portions 52. In the above way, the terminal holding member 32 (terminal module 53) is assembled at a proper assembly position with the case 10. In this state, the upper surface side retaining portions 36 are in contact with the upper edge part 19 of the opening portion 18 from below. As shown in FIGS. 5 and 6, a fitting space 54 in the form of a rectangular tube is formed over the entire periphery between the outer periphery of a region of the terminal holding member 32 forward of the retaining portions 36, 37 and the inner periphery of the opening portion 18.

The lower end parts of the board connecting portions 52 are constantly located below the lower end (lower edge part 21) of the opening portion 18 after the assembling of the terminal module 53 with the opening portion 18 is started as described above until the assembling is completed. However, since the board connecting portions 52 are constantly located behind the opening portion 18 (front wall portion 11) from the start to the completion of the assembling, the board connecting portions 52 do not interfere with the opening portion 18 (front wall portion 11).

After the terminal module 53 is assembled with the case 10, the protecting member 38 is assembled with the case 10. At this time, the protecting member 38 is brought closer to the front wall portion 11 from front of the case 10 and the tubular fitting portion 43 is fit into the opening portion 18 (fitting space 54). Associated with this, the tubular fitting portion 43 is externally fit to the terminal holding member 32. Note that if an operation of assembling the terminal module 53 with the case 10 and an operation of assembling the protecting member 38 with the case 10 are performed with the case 10, the terminal module 53 and the protecting member 38 vertically inverted, workability is good.

If the flange portion 40 comes into contact with the front surface of the front wall portion 11, the fitting of the case 10 is completed. Thereafter, screws 55 are inserted through the through holes 41 from front of the flange portion 40 and screwed and tightened into the female screw holes 17. In the above way, the assembling of the protecting member 38 with the case 10 is completed and the terminal holding member 32 and the protecting member 38 are united to configure the housing 321. The terminal module 53 and the protecting member 38 are united to complete the assembling of the board connector 30 and the assembling of the board connector 30 with the case 10.

When the screws 55 are tightened, the pressing portion 46 of the protecting member 38 presses the upper surface side retaining portions 36 against the upper edge side receiving portions 22 and presses the side surface side retaining portions 37 against the side edge side receiving portions 23. By this pressing by the pressing portion 46, the terminal holding member 32 is sandwiched between the case 10 and the protecting member 38. By this sandwiching, the terminal holding member 32 is fixed to the case 10 and the protecting member 38 with rattling restricted. The front end parts of the plurality of penetrating portions 51 are collectively surrounded by the receptacle 39 of the protecting member 38. The board connecting portions 52 are accommodated into the case 10. The lower end parts of the board connecting portions 52 project downward (outward) of the case 10 through the open part 15 of the case 10. The lower end parts of the board connecting portions 52 are passed through through holes (not shown) of the circuit board P mounted to close the open part 15 of the case 10.

The connector device A of this embodiment includes the case 10 and the board connector 30. The opening portion 18 is formed in the front surface of the case 10. The lower surface of the case 10 is open rearward. The board connector 30 includes the plurality of L-shaped terminal fittings 50 and the housing 31 to be mounted into the opening portion 18. The terminal fitting 50 includes the penetrating portion 51 extending in the front-rear direction (direction parallel to the penetrating direction of the opening portion 18) and the board connecting portion 52 extending downward from the rear end of the penetrating portion 51 and to be accommodated into the case 10. The housing 31 includes the terminal holding member 32 and the protecting member 38. The terminal holding member 32 holds the penetrating portions 51 penetrating therethrough and is mounted into the opening portion 18 from behind. The protecting member 38 is a component separate from the terminal holding member 32 and surrounds the front end parts of the penetrating portions 51 by being mounted into the opening portion 18 from front.

In assembling the board connector 30 with the case 10, the protecting member 38 separated from the terminal holding member 32 is mounted into the opening portion 18 from front of the case 10. The terminal holding member 32 is mounted into the opening portion 18 through the opening in the lower surface of the case 10. In the process of assembling the board connector 30 with the case 10, the board connecting portions 52 located behind the terminal holding members 32 need not be inserted into the opening portion 18. Therefore, according to the connector device A of this embodiment, the damage of the terminal fittings 50 (board connecting portions 52) due to interference with the opening portion 18 can be prevented.

It is considered as a means for avoiding the interference of the board connecting portions 52 and the opening portion 18 to insert the board connector 30 into the case 10 through the open part 15 in the lower surface of the case 10 and fit the board connector 30 into the opening portion 18. However, if an attempt is made to cause the receptacle 39 of the board connector 30 to project forward of the case 10, a space for temporarily accommodating the board connector 30 has to be secured in the case 10. Thus, a new problem of enlarging the case 10 arises. Further, the board connector 30 needs to be fixed to the opening portion 18 from the inside of the case 30 by bolting. It is very difficult to perform a fastening operation using a tool such as a driver in the case 10. Therefore, a method for assembling the board connector 30 through the open part 15 in the lower surface of the case 30 is not preferable.

In contrast, in the connector device A of this embodiment, the housing 31 is divided into the protecting member 38 on the side of the receptacle 39 and the terminal holding member 32 for holding the terminal fittings 50 and only the terminal holding member 32 is accommodated into the case 10. Therefore, the case 10 can be reduced in size as compared to the case where the entire housing 31 is accommodated.

Further, since the terminal holding member 32 is mounted into the opening portion 18 while being moved in parallel from behind the front wall portion 11, the board connecting portions 52 can be brought closer to the front wall portion 11 in the mounted state. In this way, an unnecessary space needs not be formed between the front wall portion 11 and the board connecting portions 52. Thus, the enlargement of the case 10 in the front-rear direction can be avoided. The enlargement of the circuit board P for closing the open part 15 in the lower surface of the case 10 can also be avoided.

The terminal holding member 32 is displaceable in the direction (vertical direction) intersecting the front-rear direction in the opening portion 18. The case 10 is formed with the receiving portions 22, 23 projecting into the case 10 from parts of the inner peripheral surface of the opening portion 18. The retaining portions 36, 37 are formed on the outer peripheral surface of the terminal holding member 32.

In the process of mounting the terminal holding member 32 into the opening portion 18, the retaining portions 36, 37 do not interfere with the receiving portions 22, 23. When the terminal holding member 32 is at a proper mount position with respect to the opening portion 18, the retaining portion 36, 37 overlap on front sides (front surfaces) of the receiving portions 22, 23.

According to this configuration, if the terminal holding member 32 is mounted into the opening portion 18, the retaining portions 36, 37 can be brought into contact with the front sides (front surfaces) of the receiving portions 22, 23. In this way, the terminal holding member 32 can be positioned in the front-rear direction with respect to the case 10 and can be prevented from being separated rearward from the opening portion 18.

The protecting member 38 is formed with the flange portion 40 for fixing the protecting member 38 to the front surface of the case 10 and the pressing portion 46 for sandwiching the retaining portions 36, 37 in the front-rear direction between the receiving portions 22, 23 and the pressing portion 46. If the protecting member 38 is mounted into the case 10 and the flange portion 40 is fixed to the front surface of the case 10, the retaining portions 36, 37 are sandwiched between the pressing portion 46 and the receiving portions 22, 23. In this way, the terminal holding member 32 is fixed to the case 10 without rattling. Further, since a dedicated fixing member for fixing the terminal holding member 32 to the case 10 is unnecessary, the number of components can be reduced.

The sealing member 45 is mounted between the outer peripheral surface (sealing groove 44) of the protecting member 38 and the inner peripheral surface (sealing surface) of the opening portion 18. By providing the sealing member 45, a clearance between the opening portion 18 and the housing 31 can be sealed in a liquid-tight manner. Since the sealing member 45 needs not be provided on the outer periphery of the terminal holding member 32, the terminal holding member 32 can be displaced in the vertical direction in the opening portion 18. In this way, the terminal holding member 32 can be set, prioritizing mounting easiness into the opening portion 18 in designing the shape of the terminal holding member 32.

Other Embodiments

The present invention is not limited to the above described and illustrated embodiment and is represented by claims. The present invention is intended to include all changes in the scope of claims and in the meaning and scope of equivalents and also include the following embodiments.

Although the terminal holding member is fixed to the case by sandwiching the retaining portions between the pressing portion and the receiving portions in the above embodiment, the terminal holding member may be fixed to the case by a dedicated fixing member.

Although the terminal holding member is positioned in the front-rear direction with respect to the case by the contact of the retaining portions with the receiving portions from front in the above embodiment, the terminal fittings may be positioned by bringing a part formed on the terminal holding member with the opening portion from behind.

Although the sealing member is mounted on the protecting member in the above embodiment, the sealing member may be mounted in the opening portion.

Although the sealing member is provided to contact the outer peripheral surface of the protecting member in the above embodiment, the sealing member may be provided to contact the outer peripheral surface of the terminal holding member.

Although the terminal holding member is displaceable in the direction (vertical direction) intersecting the penetrating direction of the opening portion in the opening portion in the above embodiment, the terminal holding member may be fit into the opening portion from behind without being displaceable in the direction (vertical direction) intersecting the penetrating direction of the opening portion in the opening portion.

Although the terminal holding member is displaced in the vertical direction (direction parallel to the length direction of the board connecting portions) in the opening portion in the above embodiment, the terminal holding member may be displaced in the lateral direction (direction intersecting the length direction of the board connecting portions) in the opening portion.

Although the sealing member is provided to seal the opening portion in the above embodiment, the sealing member may not be provided.

LIST OF REFERENCE NUMERALS

A: connector device
P: circuit board
10: case
11: front wall portion
12: upper wall portion
13: side wall portion
14 rear wall portion
15: open part
16: mounting portion
17: female screw hole
18: opening portion
19: upper edge part
20: side edge part
21: lower edge part
22: upper edge side receiving portion (receiving portion)
23: side edge side receiving portion (receiving portion)
24: sealing surface
30: board connector
31: housing
32: terminal holding member
33: body portion
34: upper surface portion
35: side surface portion
36: upper surface side retaining portion (retaining portion)
37: side surface side retaining portion (retaining portion)
38: protecting member
39: receptacle
40: flange portion (fixing portion)
41: through hole
42: spacer
43: tubular fitting portion
44: sealing groove
45: sealing member
46: pressing portion
50: terminal fitting
51: penetrating portion
52: board connecting portion
53: terminal module
54: fitting space
55: screw

What is claimed is:

1. A connector device, comprising:

a case formed with an opening portion in a front surface and having an open lower surface;

a board connector including an L-shaped terminal fitting and a housing to be mounted into the opening portion, wherein:

the terminal fitting includes a penetrating portion extending in a front-rear direction to be accommodated into the case and a board connecting portion extending downward from a rear end of the penetrating portion, a lower end part of the board connecting portion being positioned below the open lower surface of the case in an assembled state, the housing includes a terminal holding member for holding the penetrating portion penetrating therethrough, the terminal holding member being mounted into the opening portion from behind, and a protecting member separate from the terminal holding member, the protecting member surrounding a front end part of the penetrating portion by being mounted into the opening portion from front, the case is formed with a receiving portion projecting into the case from a part of an inner peripheral surface of the opening portion, a retaining portion to be overlapped on a front side of the receiving portion when the terminal holding member is mounted into the opening portion is formed on an outer peripheral surface of the terminal holding member, and the protecting member is formed with a pressing portion for sandwiching the retaining portion in the front-rear direction between the receiving portion and the pressing portion.

2. The connector device of claim 1, a sealing member is mounted between an outer peripheral surface of the protecting member and the inner peripheral surface of the opening portion.

3. The connector device of claim 1, wherein the terminal fitting includes a circuit board configured to close the open lower surface of the case.

* * * * *